United States Patent
Akamine et al.

(10) Patent No.: US 11,226,409 B2
(45) Date of Patent: Jan. 18, 2022

(54) IN-VEHICLE RADAR DEVICE

(71) Applicant: DENSO CORPORATION, Kariya (JP)

(72) Inventors: Yusuke Akamine, Nisshin (JP); Naoki Kawasaki, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 266 days.

(21) Appl. No.: 16/585,572

(22) Filed: Sep. 27, 2019

(65) Prior Publication Data

US 2020/0025905 A1 Jan. 23, 2020

Related U.S. Application Data (63) Continuation of application No. PCT/JP2018/013313, filed on Mar. 29, 2018.

(30) Foreign Application Priority Data

Mar. 31, 2017 (JP) .............................. JP2017-071198

(51) Int. Cl.
- *G01S 13/58* (2006.01)
- *G01S 7/35* (2006.01)
- *G01S 13/931* (2020.01)

(52) U.S. Cl.
CPC ............ *G01S 13/584* (2013.01); *G01S 7/352* (2013.01); *G01S 13/931* (2013.01); *G01S 7/356* (2021.05)

(58) Field of Classification Search
CPC ................................ G01S 13/584; G01S 7/352
See application file for complete search history.

(56) References Cited

U.S. PATENT DOCUMENTS

| | | | |
|---|---|---|---|
| 2008/0122680 A1* | 5/2008 | Morinaga ............. | G01S 13/584 342/109 |
| 2009/0102698 A1 | 4/2009 | Ichiyanagi et al. | |
| 2014/0218228 A1* | 8/2014 | Noda ..................... | G01S 13/584 342/147 |
| 2015/0260836 A1* | 9/2015 | Hayakawa ........... | H01Q 13/206 342/70 |
| 2017/0115386 A1* | 4/2017 | Morinaga ............... | G01S 13/53 |
| 2021/0239824 A1* | 8/2021 | Gao ........................ | G01S 13/02 |

FOREIGN PATENT DOCUMENTS

| | | |
|---|---|---|
| JP | 2002-71792 A | 3/2002 |
| JP | 2003-167048 A | 6/2003 |
| JP | 2009-103565 A | 5/2009 |
| JP | 2012-185084 A | 9/2012 |
| JP | 2012-229947 A | 11/2012 |
| JP | 2015-148577 A | 8/2015 |

* cited by examiner

*Primary Examiner* — Marcus E Windrich
(74) *Attorney, Agent, or Firm* — Maschoff Brennan

(57) ABSTRACT

An in-vehicle radar device includes a transmission section, a reception section, an analysis section, an extraction section, a speed calculation section, a distance calculation section, and a folding detection section. The folding detection section detects occurrence of erroneous calculation of a distance, when reflection intensity at a frequency peak obtained by the extraction section is smaller than a preset intensity threshold for a distance calculated by the distance calculation section and a frequency width in a frequency spectrum calculated by the analysis section is smaller than a preset width threshold.

6 Claims, 9 Drawing Sheets

IN-VEHICLE RADAR DEVICE

CROSS-REFERENCE TO RELATED APPLICATION

The present application claims the benefit of priority from Japanese Patent Application No. 2017-071198 filed with the Japan Patent Office on Mar. 31, 2017, the description of which is incorporated herein by reference.

BACKGROUND

Technical Field

The present disclosure relates to a two-frequency CW in-vehicle radar device.

Related Art

A two-frequency CW radar alternately transmits and receives two continuous waves having different frequencies, and generates a frequency difference signal of the continuous waves and the received waves. From a peak in a frequency spectrum of the frequency difference signal, the two-frequency CW radar measures a speed of a target relative to the radar. Furthermore, from a phase difference between two frequency difference signals corresponding to the two continuous waves having different frequencies, the two-frequency CW radar measures a distance from the radar to the target.

SUMMARY

As an aspect of the present disclosure, an in-vehicle radar device mounted in a vehicle is provided. The in-vehicle radar device includes: a transmission section configured to alternately transmit two types of continuous waves having different frequencies; a reception section configured to receive a reflected wave generated by reflection by a target of the continuous wave transmitted from the transmission section and generate a frequency difference signal of the received reflected wave and the continuous wave; an analysis section configured to calculate a frequency spectrum of the frequency difference signal generated by the reception section; an extraction section configured to obtain a frequency peak in the frequency spectrum calculated by the analysis section and extract a moving object; a speed calculation section configured to calculate a speed relative to the vehicle of the moving object extracted by the extraction section, from the frequency peak in the frequency spectrum; a distance calculation section configured to calculate a distance from the vehicle to the moving object, from a phase difference between two types of the frequency difference signals corresponding to the two types of continuous waves; and a folding detection section configured to detect occurrence of erroneous calculation of the distance due to phase difference folding that causes the phase difference to be $2\pi$ or more.

The folding detection section is configured to detect occurrence of erroneous calculation of the distance, when reflection intensity at the frequency peak obtained by the extraction section is smaller than a preset intensity threshold for the distance calculated by the distance calculation section and a frequency width in the frequency spectrum calculated by the analysis section is smaller than a preset width threshold, the intensity threshold being set according to the distance, the frequency width being a frequency range in which the frequency peak is included and the reflection intensity exceeding a preset noise threshold continues.

DETAILED DESCRIPTION OF THE PREFERRED EMBODIMENTS

A two-frequency CW radar alternately transmits and receives two continuous waves having different frequencies, and generates a frequency difference signal of the continuous waves and the received waves. From a peak in a frequency spectrum of the frequency difference signal, the two-frequency CW radar measures a speed of a target relative to the radar. Furthermore, from a phase difference between two frequency difference signals corresponding to the two continuous waves having different frequencies, the two-frequency CW radar measures a distance from the radar to the target (see, for example, JP 2003-167048 A).

The two-frequency CW radar may be mounted in a vehicle and used to detect a moving object approaching the vehicle and output an alarm when the vehicle is likely to collide with the moving object. However, since the two-frequency CW radar calculates a distance from the phase difference between the two frequency difference signals, a maximum distance that can be measured by the two-frequency CW radar without ambiguity is a distance corresponding to a phase difference of 2n. When the distance from the two-frequency CW radar to the target exceeds the maximum distance, the phase difference of the two frequency difference signals is folded back. Accordingly, a distance shorter than an actual distance from the two-frequency CW radar to the target is calculated. By reducing a frequency difference between the two continuous waves, the maximum distance is increased, but a distance resolution is reduced. Thus, there is a limit to the reduction of the frequency difference between the two continuous waves.

As a result of detailed studies, the inventors have found a problem in which in a case where a two-frequency CW radar is mounted in a vehicle and used to detect a moving object, when folding of a phase difference between two frequency difference signals occurs, there is a probability that a moving object is detected at a distance shorter than an actual distance and an erroneous alarm is outputted.

The present disclosure preferably provides an in-vehicle radar device capable of detecting occurrence of erroneous calculation of a distance due to folding of a phase difference.

An embodiment for implementing the present disclosure will be described with reference to the drawings.

<1. Configuration>

Figure 1:
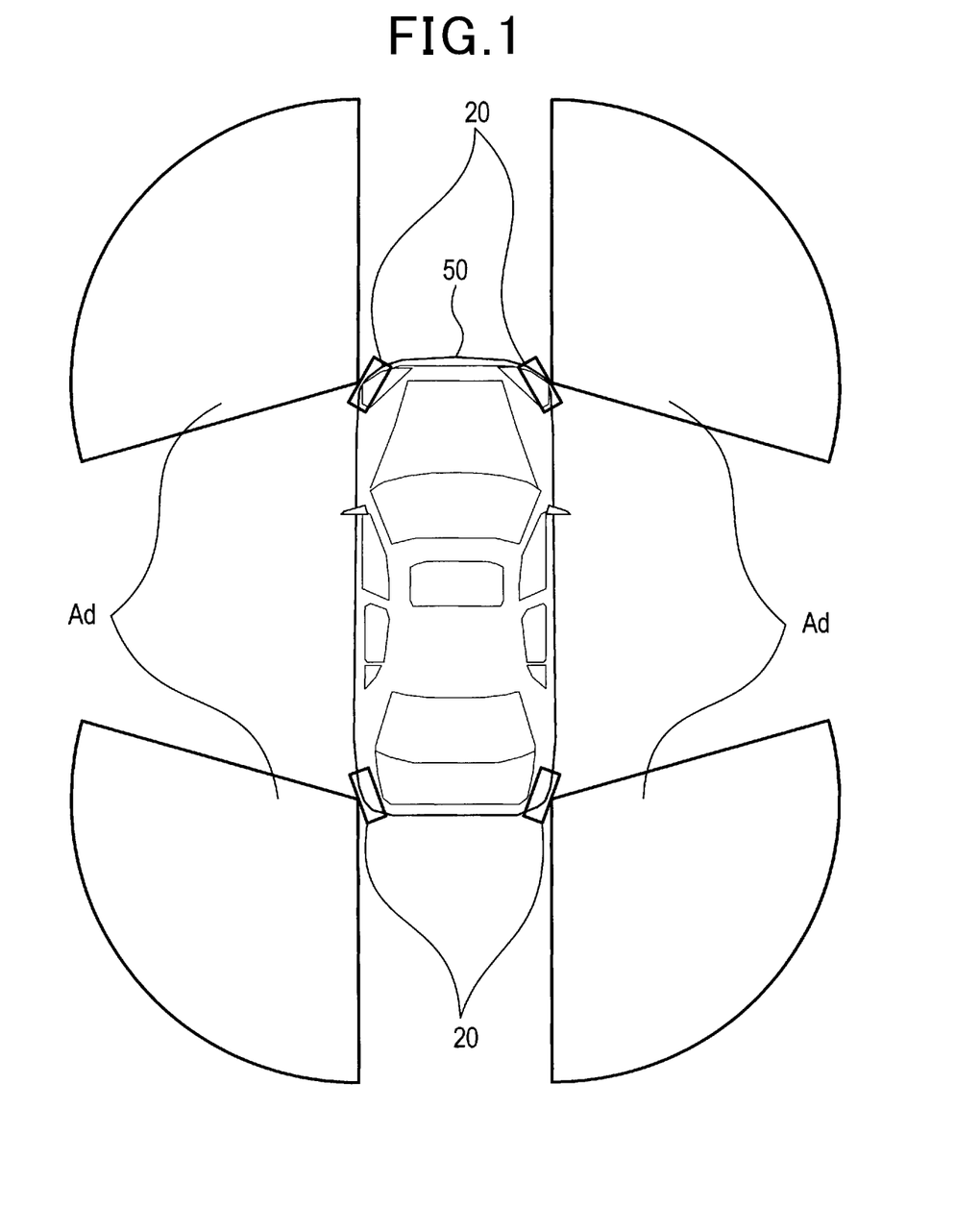
FIG. 1 is a view showing mounting positions of in-vehicle radar devices according to an embodiment.

First, a configuration of a radar device 20 according to the present embodiment will be described with reference to FIGS. 1 and 2. As shown in FIG. 1, four radar devices 20 are mounted on respective different portions, i.e., a left front side portion, a right front side portion, a left rear side portion, and a right rear side portion of a vehicle 50. Specifically, for example, the radar devices 20 are respectively mounted on left and right both ends of a front bumper and left and right both ends of a rear bumper of the vehicle 50. Detection areas Ad of the respective radar devices 20 are regions on a left front side, a right front side, a left rear side, and a right rear side of the vehicle 50.

The radar devices 20 are each a two-frequency CW millimeter wave radar. As shown in FIG. 2, the radar devices 20 each have functions of a transmission section 21, a reception section 22, an analysis section 23, an extraction section 24, a speed calculation section 25, a distance calculation section 26, a folding detection section 27, and an output control section 28.

The transmission section 21 includes a transmission array antenna constituted by a plurality of antenna elements, and transmits two types of continuous waves Tw1 and Tw2 having different frequencies. The reception section 22 includes a reception array antenna constituted by a plurality of antenna elements, and receives reflected waves Rw1 and Rw2 generated by reflection of the continuous waves Tw1 and Tw2 by a target.

The analysis section 23, the extraction section 24, the speed calculation section 25, and the distance calculation section 26 extract a moving object on the basis of the reflected waves Rw1 and Rw2, and calculate a relative speed Vr of the extracted moving object to the vehicle 50 and a distance R from the vehicle 50 to the moving object. The folding detection section 27 detects occurrence of erroneous calculation of the distance R due to folding of a phase difference used to calculate the distance R. Details of the functions of the transmission section 21, the reception section 22, the analysis section 23, the extraction section 24, the speed calculation section 25, the distance calculation section 26, and the folding detection section 27 will be described later.

The output control section 28 causes an alarm device 40 to output an alarm when the extracted moving object is approaching the vehicle 50 and the moving object is present in a specific range. The specific range is a range in which time to collision of the moving object with the vehicle 50 is a preset time threshold Tth or less. Furthermore, when occurrence of erroneous calculation of the distance R is detected by the folding detection section 27, the output control section 28 stops the output of the alarm for the moving object for which the distance R has been erroneously calculated. This prevents an erroneous alarm from being outputted for the moving object that is actually present relatively far from the vehicle 50.

The alarm device 40 is an indicator provided on a door mirror or in a vehicle cabin, a loudspeaker in the vehicle cabin, a display in the vehicle cabin, or the like. According to instructions from the output control section 28 to output an alarm, the alarm device 40 flashes, outputs an alert sound or voice, or displays an alert.

<2. Moving Object Detection Process>

Figure 3:
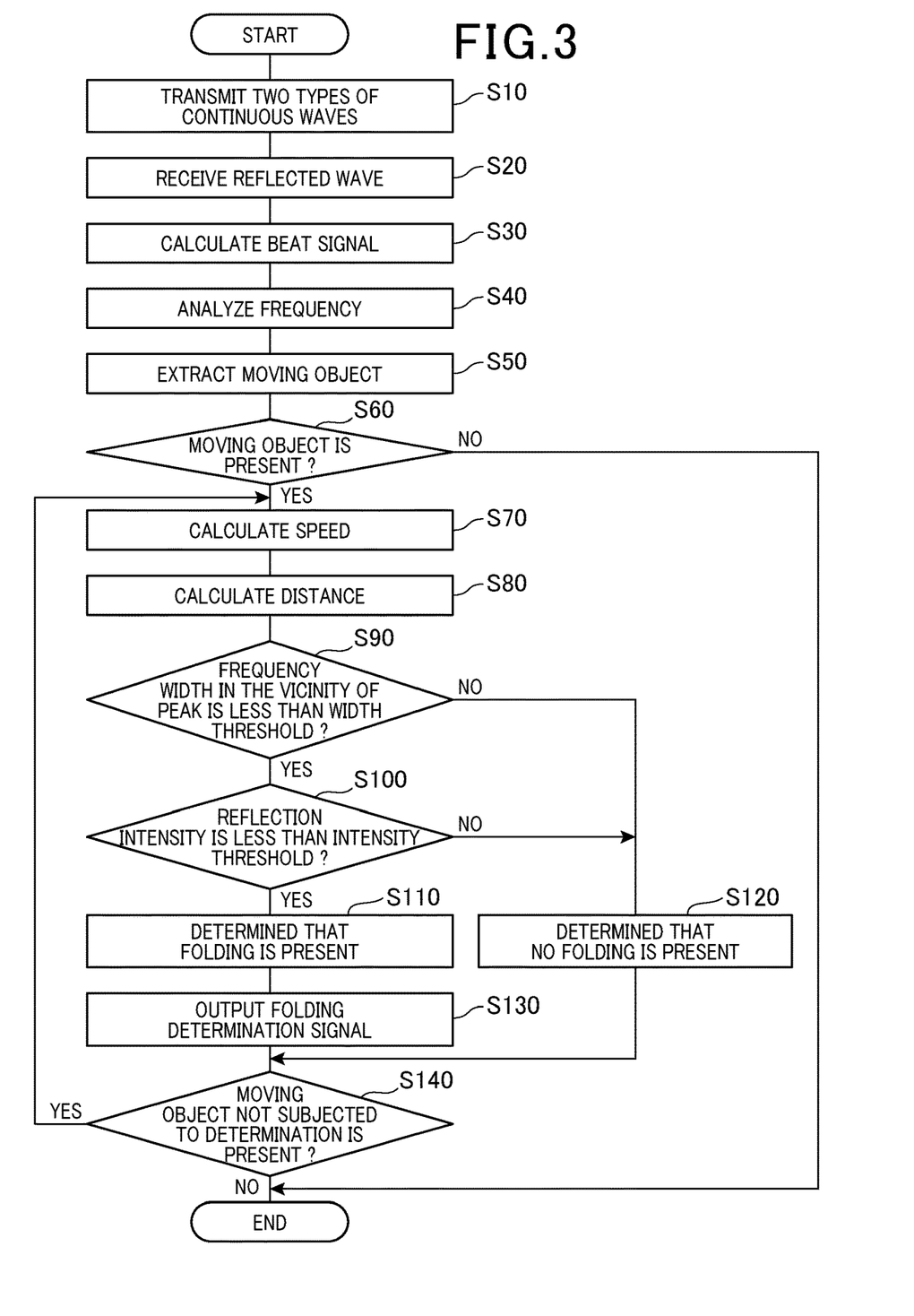
FIG. 3 is a flow chart showing a procedure for detecting a moving object.

Next, a procedure of detecting a moving object will be described with reference to a flow chart in FIG. 3. This procedure is repeatedly performed in a predetermined cycle by the radar devices 20.

First, at S10, the transmission section 21 transmits two types of continuous waves having different frequencies, i.e., continuous waves Tw1 and Tw2. Specifically, in a time division manner, the transmission section 21 alternately transmits two types of continuous waves, i.e., a continuous wave Tw1 and a continuous wave Tw2. The transmission section 21 transmits a continuous wave Tw1 having a frequency f1 according to a transmission signal St1 having the frequency f1, and transmits a continuous wave Tw2 having a frequency f2 according to a transmission signal St2 having the frequency f2. A difference $\Delta f$ between the frequency f1 and the frequency f2 is a value sufficiently smaller than an intermediate frequency fc of the frequency f1 and the frequency f2.

Figure 4:
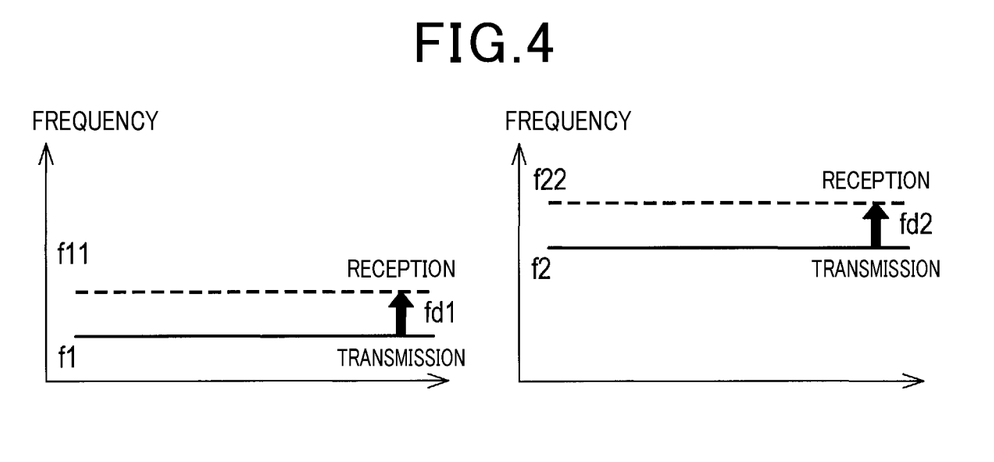
FIG. 4 is a view showing transmission frequencies and Doppler-shifted reception frequencies of two types of continuous waves.

Subsequently, at S20, the reception section 22 receives reflected waves Rw1 and Rw2 generated by reflection of the continuous waves Tw1 and Tw2 by a target, and acquires reception signals Sr1 and Sr2 from the respective reflected waves Rw1 and Rw2. As shown in FIG. 4, according to a relative speed Vr of the target, a frequency f11 of the reflected wave Rw1 is Doppler-shifted by fd1 from the frequency f1 such that f11=f1+fd1 is established. Similarly, a frequency f22 of the reflected wave Rw2 is Doppler-shifted by fd2 from the frequency f2 such that f22=f2+fd2 is established.

Subsequently, at S30, the reception section 22 mixes the reception signal Sr1 with the transmission signal St1 to generate a beat signal B1. The beat signal B1 is a frequency difference signal whose frequency component is the difference fd1 between the frequency f11 of the reception signal Sr1 and the frequency f1 of the transmission signal St1. Similarly, the reception section 22 mixes the reception signal Sr2 with the transmission signal St2 to generate a beat signal B2 which is a frequency difference signal whose frequency component is the difference fd2. Since the difference $\Delta f$ between the frequency f1 and the frequency f2 is sufficiently smaller than the intermediate frequency fc, the difference fd1 and the difference fd2 generated by the same target can be considered to be equal to each other.

Subsequently, at S40, the analysis section 23 analyzes frequencies of the beat signals B1 and B2 generated at S30 and calculates respective frequency spectra Sp1 and Sp2. Specifically, the analysis section 23 samples the beat signals B1 and B2 to acquire sampling data. Then, the analysis section 23 performs complex FFT processing to the acquired sampling data to calculate the frequency spectra Sp1 and Sp2. Furthermore, the analysis section 23 adds the frequency spectrum Sp1 to the frequency spectrum Sp2 to calculate a frequency spectrum Spa.

Subsequently, at S50, from the frequency spectrum Spa calculated by the analysis section 23, the extraction section 24 searches for a peak value that exceeds a preset noise threshold Pfth and at which the relative speed Vr is other than zero. When such a peak value is present, the extraction section 24 extracts a moving object for the peak value. When a plurality of peak values are present, the extraction section 24 extracts moving objects for the respective peak values.

Subsequently, at S60, the extraction section 24 determines whether a moving object is present, i.e., whether a moving object has been extracted at S50. At S60, if the extraction section 24 determines that no moving object is present, the present process is ended. On the other hand, at S60, if the extraction section 24 determines that a moving object is present, the control proceeds to S70. At this time, when a plurality of moving objects are present, steps S70 to S130 below are performed for each of the moving objects.

At S70, from the frequency spectrum Spa, the speed calculation section 25 calculates the relative speed Vr of the extracted moving object to the vehicle 50. Specifically, the speed calculation section 25 uses conditions that fd1≈fd2 and f1≈f2 to calculate the relative speed Vr by the following expression (1), where c represents the speed of light.

[Expression 1]

$$Vr = \frac{f_d1 \cdot c}{2f1} = \frac{f_d2 \cdot c}{2f2} \quad (1)$$

Figure 5:
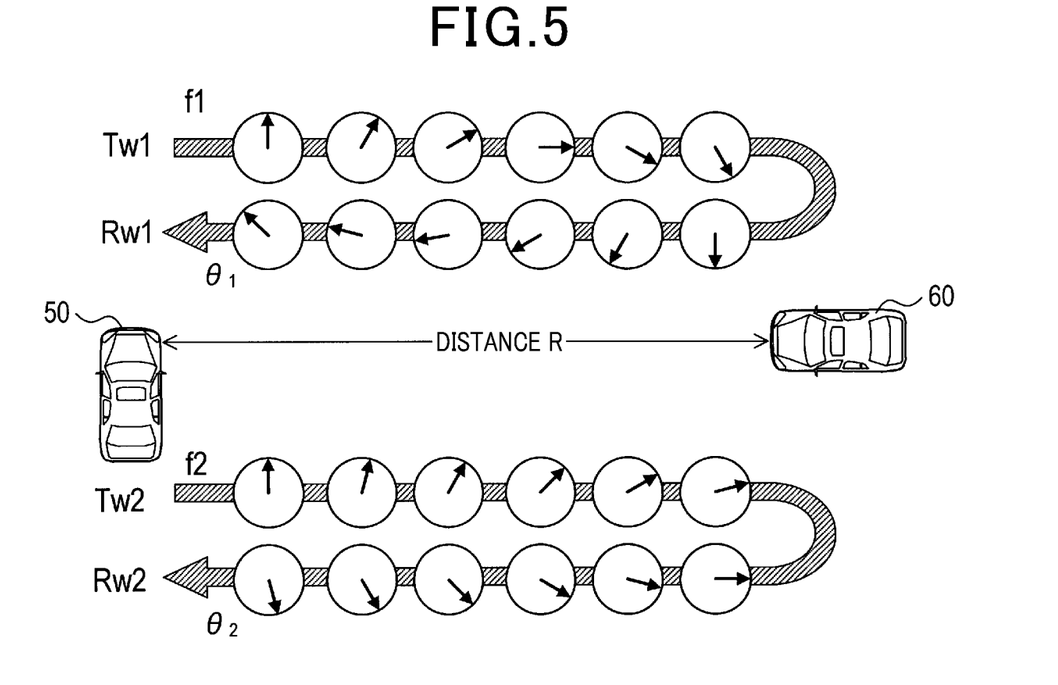
FIG. 5 is a view showing a change in phase from transmission to reception of the two types of continuous waves.

Subsequently, at S80, on the basis of a phase difference Δθ between the beat signal B1 and the beat signal B2, the distance calculation section 26 calculates a distance Rα from the vehicle 50 to the moving object. FIG. 5 shows, by arrows in circles, a change in phase θ1 of a continuous wave Tw1 and a reflected wave Rw1 when the continuous wave Tw1 is transmitted and reflected by an object vehicle 60 so that the reflected wave Rw1 is generated, and a change in phase θ2 of a continuous wave Tw2 and a reflected wave Rw2 when the continuous wave Tw2 is transmitted and reflected by the object vehicle 60 so that the reflected wave Rw2 is generated. A phase of an electromagnetic wave changes according to propagation delay time. Thus, a change amount Δθ1 of the phase θ1 and a change amount Δθ2 of the phase θ2 from the transmission to the reception have values corresponding to the distance Rα from the vehicle 50 to the object vehicle 60. The change amount Δθ1 is a difference between the phase of the continuous wave Tw1 and the phase of the reflected wave Rw1. The change amount Δθ2 is a difference between the phase of the continuous wave Tw2 and the phase of the reflected wave Rw2. The change amount Δθ1 is equal to φ1, where φ1 represents a phase of the beat signal B1. The change amount Δθ2 is equal to φ2, where φ2 represents a phase of the beat signal B2.

As shown in FIG. 5, during the transmission, the frequency f1 differs from the frequency f2, and accordingly the change amount Δθ1 of the phase differs from the change amount Δθ2 of the phase. Thus, a phase difference Δφ, which is equal to φ1-φ2, occurs between the phase φ1 of the beat signal B1 and the phase φ2 of the beat signal B2. The phase difference Δφ and the distance Rα satisfy a relationship expressed by expression (2). Thus, the distance calculation section 26 extracts the phase difference Δφ from the beat signals B1 and B2 to calculate the distance Rα.

[Expression 2]

$$R_\alpha = \frac{c \cdot \Delta\varphi}{4\pi(f2 - f1)} \quad (2)$$

Subsequently, at S90 to S120, the folding detection section 27 detects occurrence of erroneous calculation of the distance Rα due to folding of the phase difference Δφ. In expression (2), in a case where a distance Rmax represents the distance Rα when the phase difference Δφ is equal to 2π, the distance Rα that is the distance Rmax or more is not calculated by expression (2). Thus, in a case where a distance Rt represents an actual distance from the vehicle 50 to the object vehicle 60, when the distance Rt is less than the distance Rmax, the distance Rα is equal to the distance Rt. When the distance Rt is the distance Rmax or more, however, folding of the phase difference Δφ occurs, and this causes the distance Rα to be shorter than the distance Rt which is the actual distance. Thus, the object vehicle 60 is detected at a position closer to the vehicle 50 than an actual position is. At this time, if the distance Rα is used to control the output of the alarm, erroneous alarm is outputted. Therefore, the folding detection section 27 detects occurrence of erroneous detection of the distance Rα.

First, at S90, it is determined whether the moving object is a pedestrian or an object vehicle. Specifically, at S90, the folding detection section 27 determines whether a frequency width in the vicinity of a frequency peak in the frequency spectrum Spa is less than a width threshold Δfth. The frequency peak is a peak corresponding to the moving object for which the distance Rα has been calculated at S80. The frequency width in the vicinity of the frequency peak is a frequency width, in the frequency spectrum Spa, in which the frequency peak is included and reflection intensity exceeding the noise threshold Pfth continues.

When a pedestrian and an object vehicle are present at the same distance, reflection intensity of reflected waves Rw1 and Rw2 from the pedestrian is smaller than reflection intensity of reflected waves Rw1 and Rw2 from the object vehicle. When a pedestrian is present far at the distance Rmax or more, in many cases, reflection intensity of reflected waves Rw1 and Rw2 from the pedestrian is very small and is confused with noise, and accordingly the pedestrian is not extracted as the moving object. Thus, in many cases, folding of the phase difference Δφ occurs when an object vehicle that is present far at the distance Rmax or more is extracted as the moving object. Accordingly, first, by determining whether the extracted moving object is a pedestrian or a vehicle, it can be determined whether there is a probability that folding has occurred.

A pedestrian typically swings their arms while walking. A speed of the arm extended forward of their torso is faster than a speed of the torso, and a speed of the arm extended backward of the torso is slower than the speed of the torso. This leads to relatively large variation in speed of the pedestrian depending on a portion of a body of the pedestrian at which continuous waves are reflected, and results in a relatively wide width of the frequency spectrum. On the other hand, a speed of an object vehicle is mainly a speed of a body of the object vehicle. This leads to relatively small variation in speed of the object vehicle, and results in a relatively narrow width of the frequency spectrum.

Thus, at S90, when the frequency width is the width threshold Δfth or more, it is determined that the moving object is a pedestrian, and the control proceeds to S120. The width threshold Δfth is a preset value, and is a value larger than a spectral width of a speed of a vehicle and smaller than a spectral width of a speed of a pedestrian. On the other hand, at S90, when the frequency width is less than the width threshold Δfth, it is determined that the moving object is an object vehicle, and the control proceeds to S100.

At S100, the folding detection section 27 determines whether the distance Rt is equal to the distance Rα (Rt=Rα) and the object vehicle is present at the distance Rα, or the distance Rt is longer than the distance Rα (Rt>Rα) and the object vehicle is present at a distance farther than the distance Rα. Specifically, at S100, reflection intensity at the frequency peak corresponding to the moving object for which the distance Rα has been calculated at S80 is compared with a preset intensity threshold Pth (Rα). Expression (3) shows a radar equation, where Pr represents reception electric power, Pt represents transmission electric power, G represents antenna gain, λ represents a wavelength, σ represents a radar reflection cross-sectional area, and Ls represents a system loss. As shown in expression (3), the reception electric power Pr is reduced as the distance Rt is increased. Thus, in comparison between (i) reflection intensity of reflected waves Rw1 and Rw2 from the object vehicle that is present at a distance farther than the distance Rα and (ii) reflection intensity of reflected waves Rw1 and Rw2 from the object vehicle that is present at the distance Rα, when the distance Rα has the same value, (i) is smaller than (ii).

[Expression 3]

$$P_r = \frac{P_t G^2 \lambda^2 \sigma}{(4\pi)^3 R_t^4 L_s} \tag{3}$$

Figure 6:
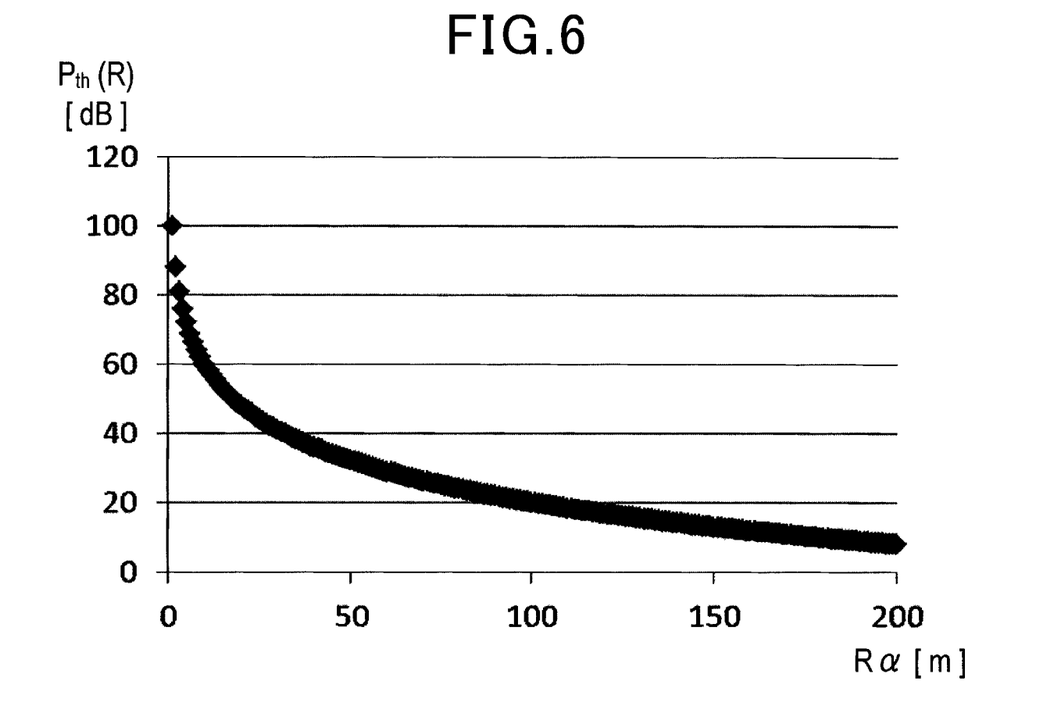
FIG. 6 is a view showing an example of an intensity threshold relative to a distance.

FIG. 6 shows an example of the intensity threshold Pth (Rα). The intensity threshold Pth (Rα) is set to a smaller value as the distance Rα becomes smaller. Furthermore, the intensity threshold Pth (Rα) is set to a value smaller than the reflection intensity of the reflected waves Rw1 and Rw2 from the object vehicle that is present at the distance Rα and larger than reflection intensity of reflected waves Rw1 and Rw2 from a pedestrian that is present at the distance Rα.

At S100, if the reflection intensity at the frequency peak is the intensity threshold Pth (Rα) or more, it is determined that the distance Rt is equal to the distance Rα (Rt=Rα), and the control proceeds to S120. On the other hand, at S100, if the reflection intensity at the frequency peak is less than the intensity threshold Pth (Rα), it is determined that the distance Rt is longer than the distance Rα (Rt>Rα), and the control proceeds to S110.

At S110, it is determined that folding of the phase difference Δφ is present, and the control proceeds to S130. At S130, the folding detection section 27 outputs a folding determination signal to the output control section 28 and the transmission section 21, and the control proceeds to S140.

At S120, it is determined that no folding of the phase difference Δφ is present, and the control proceeds to S140.

At S140, it is determined whether the moving objects extracted at S50 include a moving object whose speed and distance have not been calculated and that has not been subjected to folding determination. At S140, if it is determined that the moving objects include a moving object not subjected to folding determination, the control returns to S70. On the other hand, at S140, if it is determined that the moving objects does not include a moving object not subjected to folding determination, the present process is ended.

When the output control section 28 receives the folding determination signal, the output control section 28 stops the output of the alarm for the moving object corresponding to the folding determination signal.

When the transmission section 21 receives the folding determination signal, in a next process cycle, the transmission section 21 reduces the difference Δf between the frequency f1 and the frequency f2 and transmits continuous waves Tw1 and Tw2. Accordingly, a distance resolution is reduced, but the distance Rmax is increased, and thus occurrence of erroneous detection of the distance Rα is prevented. Furthermore, when a moving object other than the moving object for which occurrence of erroneous calculation of the distance Rα has been detected is present in the specific range described above, the transmission section 21 stops the reduction of the difference Δf. Accordingly, when a moving object requiring attention is present around the vehicle 50, higher priority is placed on prevention of a reduction in calculation accuracy of the distance Rα of the moving object requiring attention than on correct calculation of the distance Rα of the moving object that is present relatively far.

At S70, the speed calculation section 25 may estimate an arrival direction of the reflected waves Rw1 and Rw2, i.e., an azimuth of the moving object to the vehicle 50. Then, the speed calculation section 25 may use the estimated azimuth of the moving object, the relative speed Vr of the moving object, and an own vehicle speed received from a vehicle speed sensor 10 to calculate a moving speed Vm of the moving object.

Furthermore, in addition to the conditions used for the determinations at S90 and S100, the folding detection section 27 may detect occurrence of erroneous detection of the distance R of the moving object on condition that the moving speed Vm of the moving object has exceeded a speed threshold Vth. The speed threshold Vth is set in advance to a value larger than a general moving speed of a pedestrian and smaller than a moving speed of a vehicle traveling on a general road. This allows a more reliable determination of whether the moving object is a vehicle or a pedestrian.

<3. Folding Determination Operation>

Figure 7:
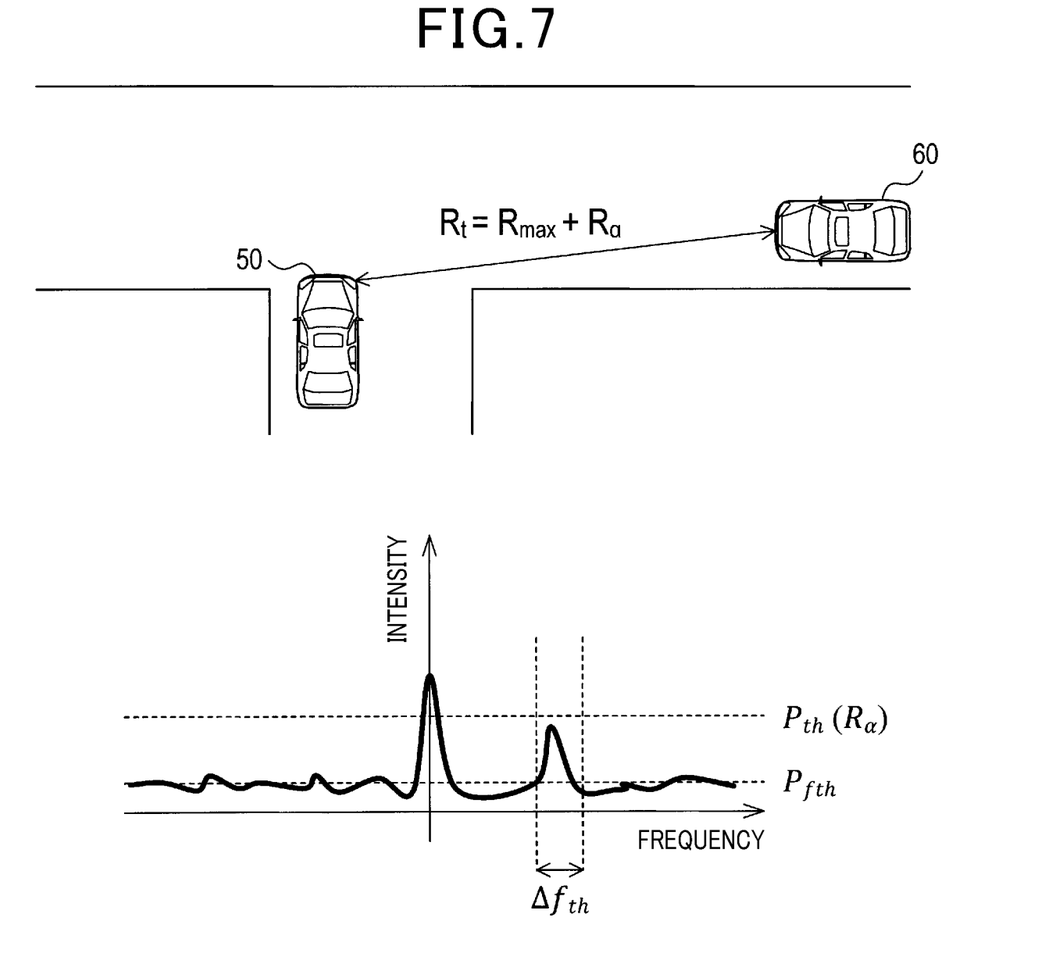
FIG. 7 is a view showing a determination example in which folding is present.

Next, an example of folding determination operation performed by the radar device 20 will be described with reference to FIGS. 7 to 9. FIG. 7 shows an example of a case where the object vehicle 60 is present at a position at the distance Rmax or more from the vehicle 50. In this case, as shown in FIG. 7, a frequency width in the vicinity of the frequency peak is smaller than the width threshold Δfth, and reflection intensity at the frequency peak is smaller than the intensity threshold Pth (Rα). In this case, therefore, it is determined that folding of the phase difference Δφ is present.

Figure 8:
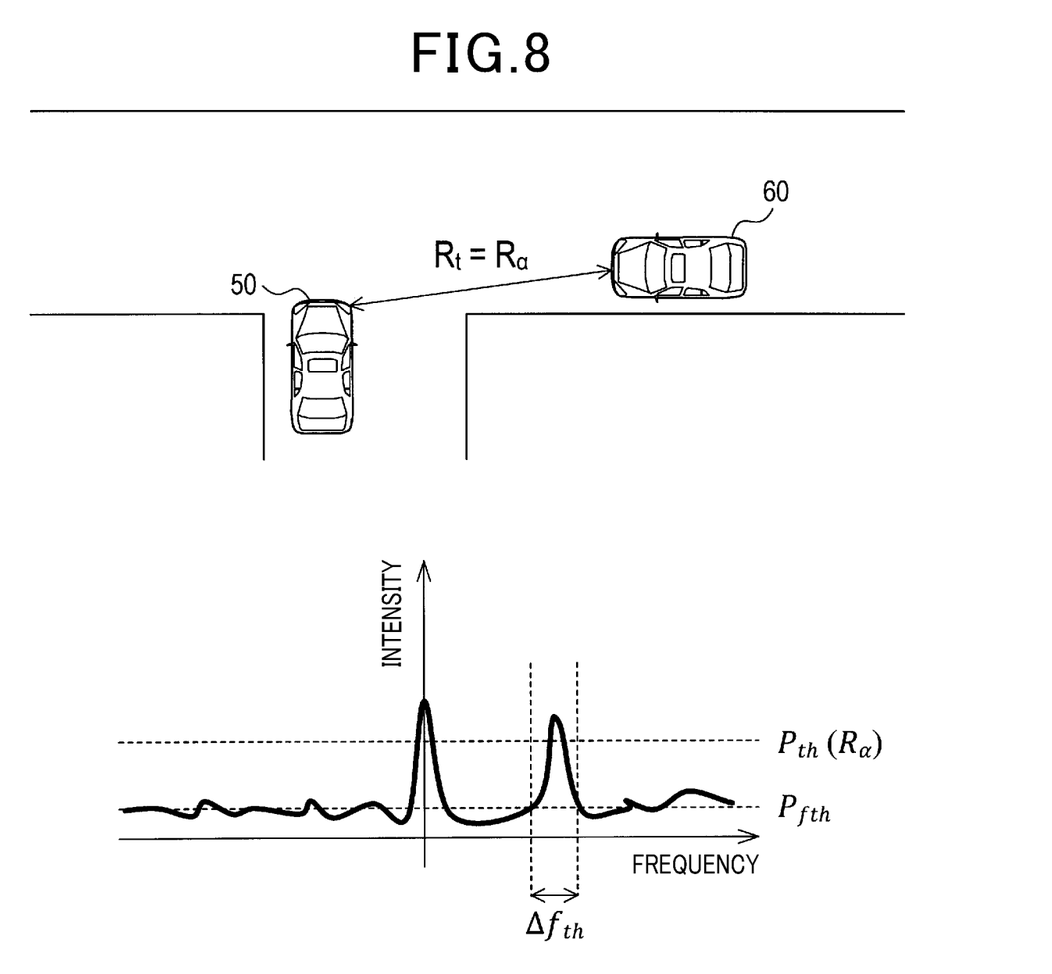
FIG. 8 is a view showing a determination example in which no folding is present.

Next, FIG. 8 shows an example of a case where the object vehicle 60 is present at a position at a distance closer than the distance Rmax from the vehicle 50. In this case, as shown in FIG. 8, a frequency width in the vicinity of the frequency peak is smaller than the width threshold Δfth, but reflection intensity at the frequency peak is larger than the intensity threshold Pth (Rα). In this case, therefore, it is determined that no folding of the phase difference Δφ is present.

Figure 9:
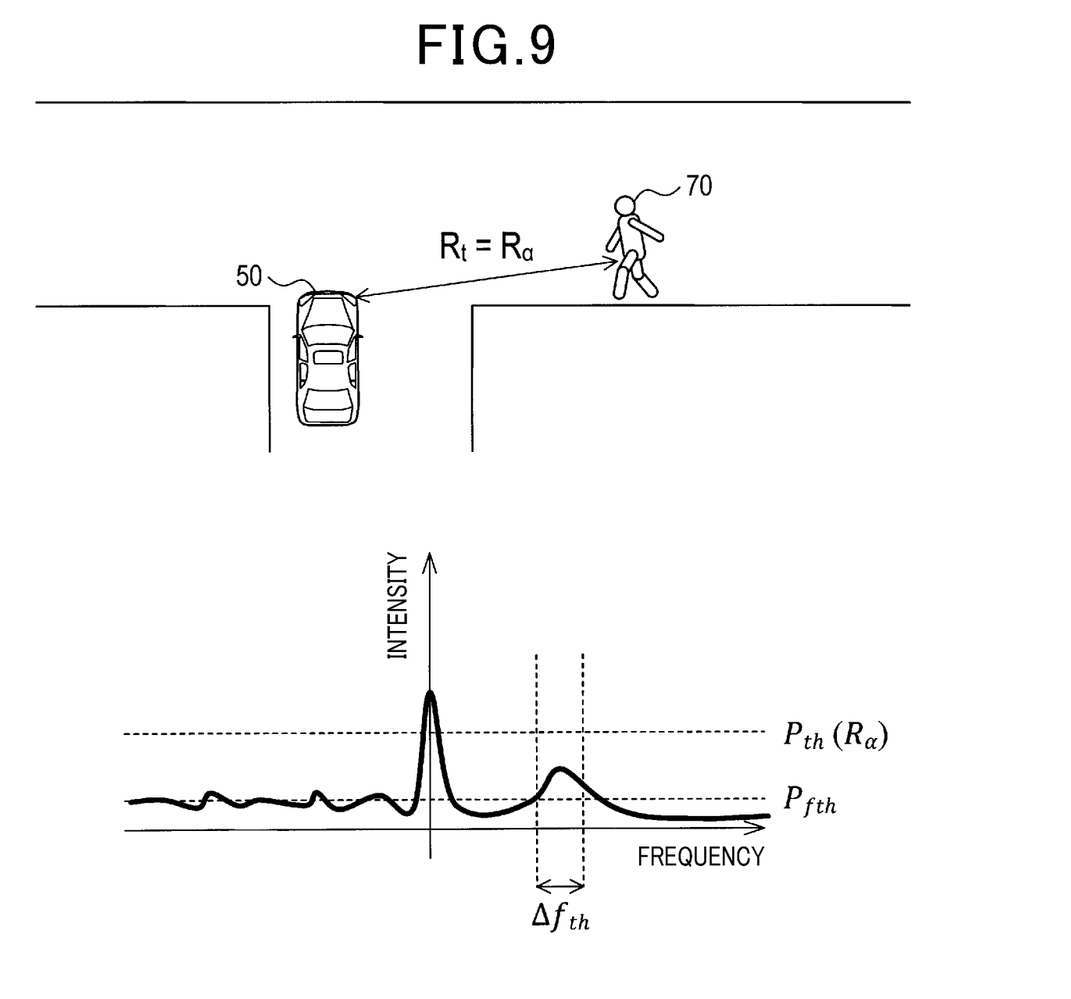
FIG. 9 is a view showing a determination example in which no folding is present.

Next, FIG. 9 shows an example of a case where a pedestrian 70 is present at a position at a distance closer than the distance Rmax from the vehicle 50. In this case, as shown in FIG. 9, reflection intensity at the frequency peak is smaller than the intensity threshold Pth (Rα), but a frequency width in the vicinity of the frequency peak is larger than the width threshold Δfth. In this case, therefore, it is determined that no folding of the phase difference Δφ is present.

<4. Effects>

The first embodiment described above yields the following effects.

(1) By focusing on the difference in variation in moving speed between a vehicle and a pedestrian and the difference in reflection intensity between a vehicle that is present at the distance Rα and a vehicle that is present at a distance farther than the distance Rα, the frequency width in the vicinity of the frequency peak and the reflection intensity at the frequency peak are used for the folding determination. Thus, occurrence of erroneous calculation of the distance Rα due to folding can be accurately detected.

(2) When the moving speed Vm of the moving object is calculated, and the condition that the moving speed Vm is a moving speed impossible for a pedestrian is added to the condition used for the folding determination, occurrence of erroneous calculation of the distance Rα can be more accurately detected.

(3) When occurrence of erroneous calculation of the distance Rα is detected, the frequency difference Δf between the two types of continuous waves Tw1 and Tw2 is reduced. Accordingly, the distance resolution is reduced, but the maximum distance Rmax that can be measured without folding of the phase difference Δφ is increased. Consequently, occurrence of erroneous calculation of the distance Rα can be prevented.

(4) The moving object for which erroneous calculation of the distance Rα has occurred is present relatively far from the vehicle 50, and thus does not require immediate attention. Accordingly, when a moving object for which time to collision with the vehicle 50 is the time threshold Tth or less is present around the vehicle 50, the reduction of the frequency difference Δf is stopped, and higher priority is placed on prevention of the reduction in the distance resolution. This makes it possible to accurately detect the distance Rα of the moving object that is present around the vehicle 50 and pay attention to the moving object.

(5) The moving object for which erroneous calculation of the distance Rα has occurred is present relatively far from the vehicle 50, and thus does not require immediate attention. Accordingly, when occurrence of erroneous calculation of the distance Rα is detected, the output of the alarm for the moving object for which the distance Rα has been erroneously calculated is stopped. This makes it possible to prevent an erroneous alarm from being outputted.

Other Embodiments

The embodiment of the present disclosure has been described, but the present disclosure is not limited to the above embodiment and may be modified in various manners.

Figure 2:
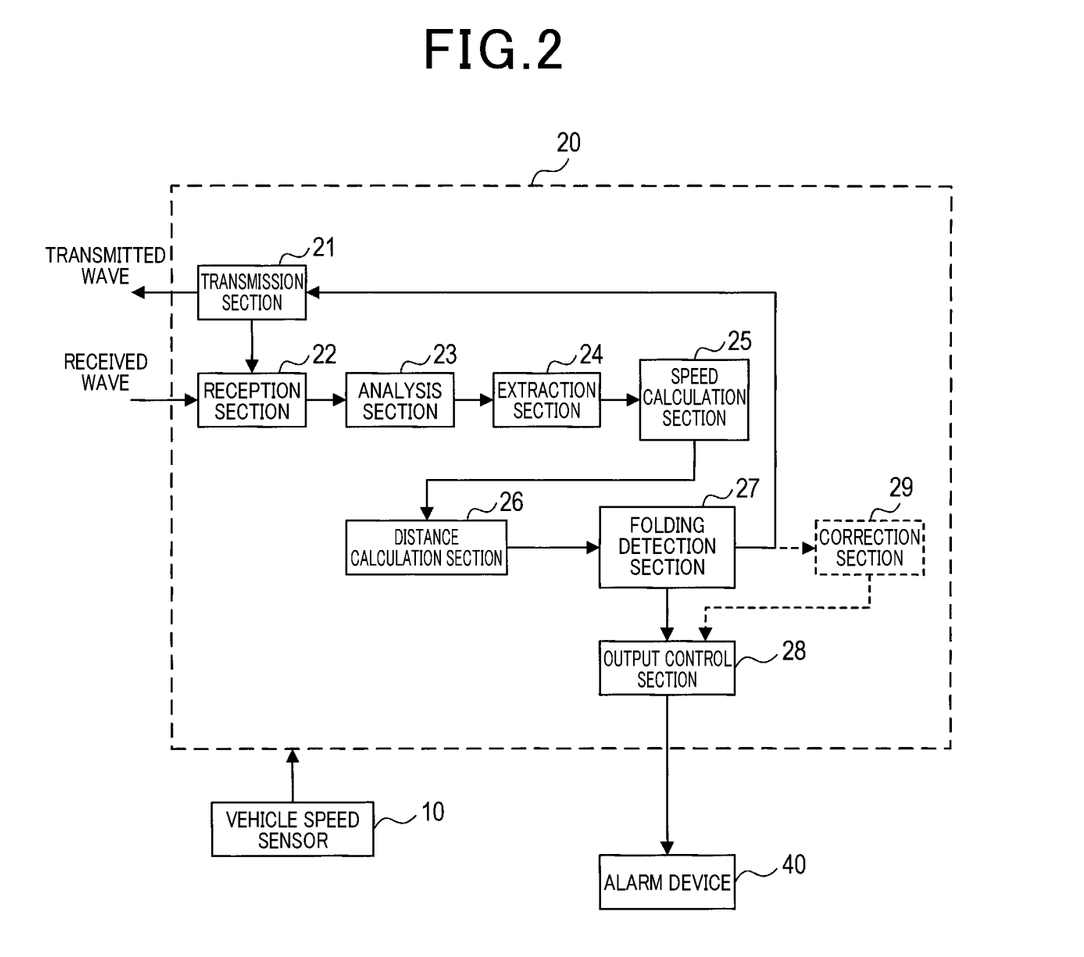
FIG. 2 is a block diagram showing a configuration of the in-vehicle radar device.

(a) As shown by a dashed line in FIG. 2, the radar device 20 may have a function of a correction section 29 that performs folding correction of the distance Rα. When the folding detection section 27 determines that folding is present, the folding detection section 27 may output a folding determination signal to the correction section 29 and the transmission section 21. In this case, the output control section 28 only needs to use the distance Rα corrected by the correction section 29 to control the output of the alarm. Thus, even when erroneous calculation of the distance Rα due to folding occurs, the output control section 28 can use the correct distance Rα to control the output of the alarm.

(b) In the above embodiment, the four radar devices 20 are mounted on the respective different portions of the vehicle 50, but the mounting positions of the radar devices 20 are not limited to this. For example, two radar devices 20 may be mounted on respective two different portions, i.e., a front center portion and a rear center portion of the vehicle 50. Alternatively, six radar devices 20 may be mounted on respective six different portions in total, i.e., three front portions and three rear portions of the vehicle 50. It is only necessary for at least one radar device 20 to be mounted on the vehicle 50 according to an area in which the detection is required to be performed.

(c) In the above embodiment, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, a part of the configuration of the embodiment may be omitted. Furthermore, at least a part of the configuration of the embodiment may be added to or substituted by another part of the configuration of the embodiment. Any aspect included in the technical idea specified only by the wording of the claims is an embodiment of the present disclosure.

(d) Other than the in-vehicle radar device described above, the present disclosure may also be implemented in various forms such as a system including the in-vehicle radar device as a component, a program for allowing a computer to function as the in-vehicle radar device, a non-transitory tangible storage medium such as a semiconductor memory in which the program is stored, and a folding detection method.

An aspect of the present disclosure is an in-vehicle radar device (20) mounted in a vehicle (50), and includes a transmission section (21), a reception section (22), an analysis section (23), an extraction section (24), a speed calculation section (25), a distance calculation section (26), and a folding detection section (27). The transmission section alternately transmits two types of continuous waves having different frequencies. The reception section receives a reflected wave generated by reflection by a target of the continuous wave transmitted from the transmission section and generates a frequency difference signal of the received reflected wave and the continuous wave. The analysis section calculates a frequency spectrum of the frequency difference signal generated by the reception section. The extraction section obtains a frequency peak in the frequency spectrum calculated by the analysis section and extracts a moving object. The speed calculation section calculates a speed relative to the vehicle of the moving object extracted by the extraction section, from the frequency peak in the frequency spectrum. The distance calculation section calculates a distance from the vehicle to the moving object, from a phase difference between two types of the frequency difference signals corresponding to the two types of continuous waves. The folding detection section detects occurrence of erroneous calculation of the distance due to phase difference folding that causes the phase difference to be $2\pi$ or more.

The folding detection section detects occurrence of erroneous calculation of the distance, when reflection intensity at the frequency peak obtained by the extraction section is smaller than a preset intensity threshold for the distance calculated by the distance calculation section and a frequency width in the frequency spectrum calculated by the analysis section is smaller than a preset width threshold. The intensity threshold is set according to the distance. The frequency width is a frequency range in which the frequency peak is included and the reflection intensity exceeding a preset noise threshold continues.

According to an aspect of the present disclosure, a moving object is extracted from a frequency spectrum of a generated frequency difference signal. Then, from a frequency peak in the frequency spectrum, a relative speed of the extracted moving object is calculated. Furthermore, from a phase difference between two types of frequency difference signals corresponding to two types of continuous waves, a distance from the vehicle to the moving object is calculated.

When a pedestrian is present at a relatively far position that causes folding of a phase difference, in many cases, reflection intensity of reflected waves from the pedestrian is very small and is confused with noise, and accordingly the pedestrian is not extracted. Thus, in many cases, folding of the phase difference occurs when a vehicle that is present relatively far is extracted as the moving object. Accordingly, first, by determining whether the extracted moving object is a pedestrian or a vehicle, it can be determined whether there is a probability that folding has occurred. A pedestrian swings their arms while walking. This leads to relatively large variation in detected speed of the pedestrian depending on portions of a body of the pedestrian at which continuous waves are reflected. When the moving object is a pedestrian, therefore, a width in the vicinity of the frequency peak in the frequency spectrum is relatively wide. On the other hand, a speed of a vehicle is mainly a speed of a body of the vehicle. This leads to relatively small variation in detected speed of the vehicle. When the moving object is a vehicle, therefore, a width in the vicinity of the frequency peak in the frequency spectrum is relatively narrow. Thus, from the width in the vicinity of the frequency peak in the frequency spectrum, it can be determined whether the moving object is a pedestrian or a vehicle.

Furthermore, when it is determined that the moving object is a vehicle, by determining whether the vehicle is present at a calculated distance or at a distance farther than the calculated distance, it can be determined whether folding has occurred. As compared with when the vehicle is present at the calculated distance, when the vehicle is present at a distance farther than the calculated distance, detected reflection intensity is small. Accordingly, from the reflection intensity at the frequency peak, it can be determined whether the vehicle is present at the calculated distance or at a distance farther than the calculated distance. Therefore, by using the reflection intensity at the frequency peak and the frequency width in the vicinity of the frequency peak, it is possible to accurately detect occurrence of erroneous calculation of the distance due to folding of a phase difference.

What is claimed is:

1. An in-vehicle radar device mounted in a vehicle, the in-vehicle radar device comprising:
    a transmission section configured to alternately transmit two types of continuous waves having different frequencies;
    a reception section configured to receive a reflected wave generated by reflection by a target of a continuous wave transmitted from the transmission section and generate a frequency difference signal of the received reflected wave and the continuous wave;
    an analysis section configured to calculate a frequency spectrum of the frequency difference signal generated by the reception section;
    an extraction section configured to obtain a frequency peak in the frequency spectrum calculated by the analysis section and extract a moving object;
    a speed calculation section configured to calculate a relative speed to the vehicle of the moving object extracted by the extraction section, from the frequency peak in the frequency spectrum;
    a distance calculation section configured to calculate a distance from the vehicle to the moving object, from a phase difference between two types of the frequency difference signals corresponding to the two types of continuous waves; and
    a folding detection section configured to detect occurrence of erroneous calculation of the distance due to phase difference folding that causes the phase difference to be $2\pi$ or more, wherein
    the folding detection section is configured to detect occurrence of erroneous calculation of the distance, when reflection intensity at the frequency peak obtained by the extraction section is smaller than a preset intensity threshold for the distance calculated by the distance calculation section and a frequency width in the frequency spectrum calculated by the analysis section is smaller than a preset width threshold, the intensity threshold being set according to the distance, the frequency width being a frequency range in which the frequency peak is included and the reflection intensity exceeding a preset noise threshold continues.

2. The in-vehicle radar device according to claim 1, wherein
    the speed calculation section is configured to calculate a moving speed of the moving object from the relative speed, and
    the folding detection section is configured to further detect occurrence of erroneous calculation of the distance of the moving object on condition that the calculated moving speed of the moving object exceeds a preset speed threshold.

3. The in-vehicle radar device according to claim 1, wherein the transmission section is configured to reduce a frequency difference between the two types of continuous waves and transmit the two types of continuous waves, when occurrence of erroneous calculation of the distance is detected by the folding detection section.

4. The in-vehicle radar device according to claim 3, wherein the transmission section is configured to stop reducing of the frequency difference between the two types of continuous waves, when a moving object other than the moving object for which occurrence of erroneous calculation of the distance has been detected by the folding detection section is present in a range in which time to collision with the vehicle is a preset time threshold or less.

5. The in-vehicle radar device according to claim 1, further comprising an output control section configured to cause an alarm device to output an alarm, when the moving object extracted by the extraction section is approaching the vehicle, wherein
    the output control section is configured to stop the output of the alarm for the moving object for which the distance has been erroneously calculated, when occurrence of erroneous calculation of the distance is detected by the folding detection section.

6. The in-vehicle radar device according to claim 1, further comprising a correction section configured to perform folding correction of the distance calculated by the distance calculation section, when occurrence of erroneous calculation of the distance is detected by the folding detection section.

* * * * *